United States Patent [19]

Fullar

[11] Patent Number: 4,848,571

[45] Date of Patent: Jul. 18, 1989

[54] PROTECTIVE HOUSING FOR TRANSPORTING CIRCULAR SAW BLADES

[76] Inventor: Charles R. Fullar, P.O. Box 3, South Haven, Mich. 49090

[21] Appl. No.: 261,150

[22] Filed: Oct. 24, 1988

[51] Int. Cl.⁴ ............................................ B65D 85/28
[52] U.S. Cl. .................................... 206/372; 206/303; 206/493; 206/495; 206/452
[58] Field of Search ....................... 206/39.5, 39.6, 54, 206/303, 310, 354, 355, 357, 372, 373, 493, 495, 445, 451, 452; 411/107, 303, 81; 294/34, 158

[56] References Cited

U.S. PATENT DOCUMENTS

| | | | |
|---|---|---|---|
| 186,066 | 1/1877 | Swingly | 411/81 |
| 417,417 | 12/1889 | Gedney | 411/81 |
| 483,991 | 10/1892 | Chase . | |
| 1,137,126 | 4/1915 | Fuller | 206/310 |
| 1,406,939 | 4/1922 | Currie | 206/310 |
| 1,740,424 | 12/1929 | Blaine | 206/449 |
| 1,970,078 | 8/1934 | Dillon | 411/107 |
| 2,459,460 | 1/1949 | Segal | 206/46 |
| 2,624,452 | 1/1953 | Shnitzler | 206/355 |
| 2,780,486 | 2/1957 | Loughlin | 294/158 |
| 3,053,424 | 9/1962 | Reinhard | 224/45 |
| 3,870,148 | 3/1975 | Hite | 206/372 |
| 4,415,080 | 11/1983 | Romine | 206/303 |
| 4,450,955 | 5/1984 | Featherston | 206/395 |
| 4,588,082 | 5/1986 | Ridings | 206/349 |
| 4,784,263 | 11/1988 | Stanley | 206/303 |

FOREIGN PATENT DOCUMENTS 675994 12/1963 Canada .............................. 294/158

Primary Examiner—David T. Fidei
Attorney, Agent, or Firm—Samuel Kurlandsky

[57] ABSTRACT

A protective housing is provide for transporting circular saw blades, comprising an integral structure formed of a face plate, a lateral flange at each of two opposite edges disposed perpendicularly to the face plate, and a foot flange extending perpendicularly from each lateral flange adapted to engage a supporting surface. A carriage bolt extends through and aperture in the center of the face plate. A plurality of circular saw blades may be placed in the structure inside the foot flanges, and the carriage bolt inserted through the aperture in the face plate and through the apertures in the centers of the saw blades. A nut, such as a wing nut, is then screwed onto the carriage bolt and tightened down against the saw blades. The housing provides a convenient means for transporting the blades to and from a job, providing protection for the blades themselves, the workman, and the environment.

8 Claims, 2 Drawing Sheets

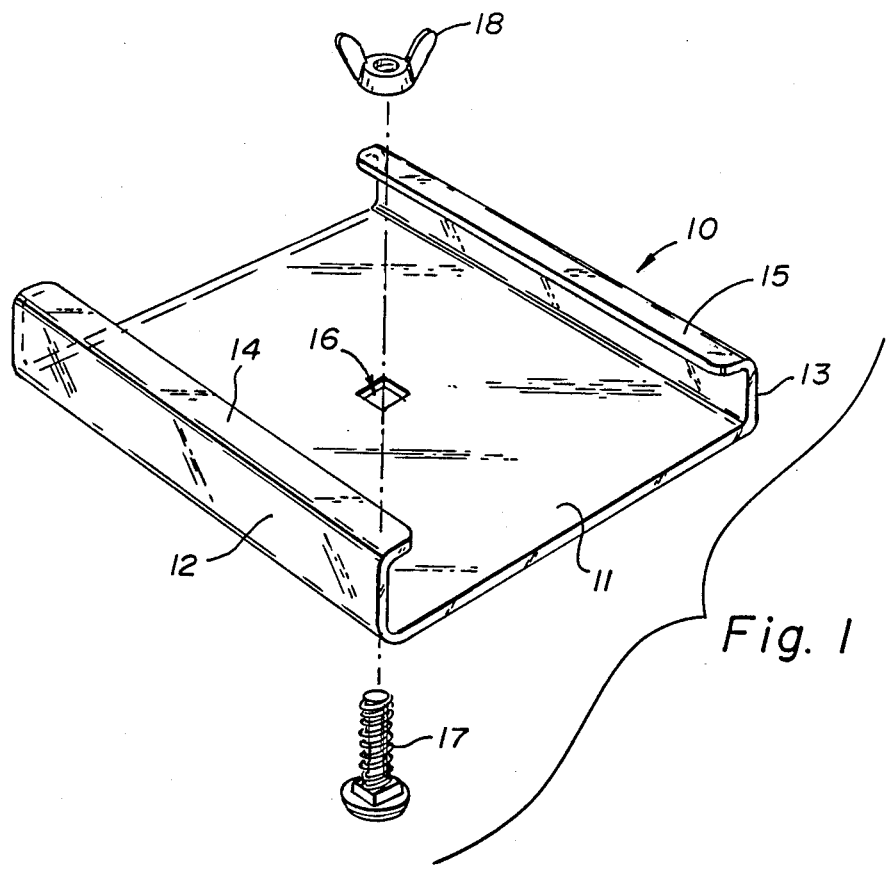
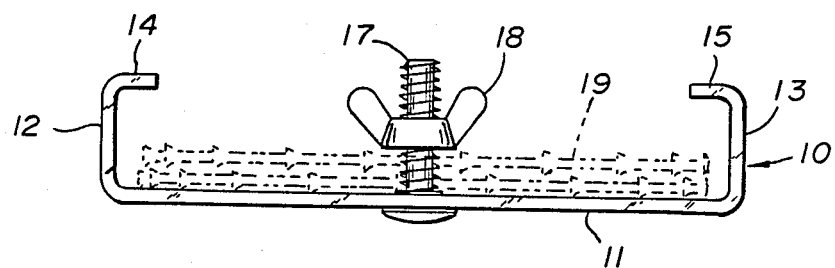

4,848,571

PROTECTIVE HOUSING FOR TRANSPORTING CIRCULAR SAW BLADES

BACKGROUND OF THE INVENTION

1. Field of the Invention

The present invention relates to circular saw blades, and more particularly refers to a convenient and sturdy housing or case for safely storing or transporting circular saw blades.

2. Description of the Prior Art

Packages for storing circular saw blades of several types have been disclosed in the prior art. In some of the packages cases have been provided formed of two opposite face plates bolted together. In others a cavity has been provided in one face plate to receive the blades, with a second face plated affixed to the first with screws. In another disclosed device a carrying case is provided for storing a plurality of circular saw blades, consisting of a main body portion having a central separator wall with removable inserts for providing space means for receiving individual saw blades, the upper portion of the device having a hingeable cover with hasp and eye means for locking the device. Although the prior art devices operate as stated, they have several deficiencies. First, they are complicated and expensive to build. Some require the special machining of parts and materials which are not readily obtainable on the market. Others are more complicated to assemble and disassemble when the workman goes to and from his job. Most require expensive materials and fabricating processes. Others don't provide the necessary protection from accidental jolting or dropping.

SUMMARY OF THE INVENTION

It is an object of the present invention to provide a protective housing or carrying case for circular saw blades.

It is another object of the invention to provide a housing or carrying case for circular saw blades which has sufficient mechanical integrity to withstand the physical stress encountered during transportation, such as bumps or dropping.

It is a further object to provide a device of the type described which can be readily assembled and disassembled.

It is an additional object to provide a protective housing for circular saw blades which can be manufactured from readily available materials which do not require expensive processing.

A still further object of the invention is to provide a housing for circular saw blades which is relatively inexpensive to produce.

The foregoing and other objects, advantages and characterizing features will become apparent from the following description of certain illustrative embodiments of the invention, considered together with the accompanying drawing, wherein like reference numerals signify like elements throughout the various figures.

According to the invention, a protective housing for transporting circular saw blades is provided comprising a face plate, lateral flanges provided at two opposite edges of the face plate and substantially perpendicular thereto, and foot flanges extending one from the free edge of each of the lateral flanges, and extending toward each other. A bolt extends through an aperture provided in the center of the face plate. and is adapted to extend through the center apertures of the circular saw blades. A nut is provided for engaging the threads of the bolt for locking the saw blades securely in place. The housing protects the blades from injury, and further protects the workman from possible injury and the environment from possible damage during transportation of the blades.

BRIEF DESCRIPTION OF THE DRAWING

FIG. 1 is a perspective view, partly exploded, of the protective housing of the present invention.

FIG. 2 is an edge view of the housing showing a plurality of circular saw blades secured therein.

DESCRIPTION OF THE PREFERRED EMBODIMENTS

Figure 3:
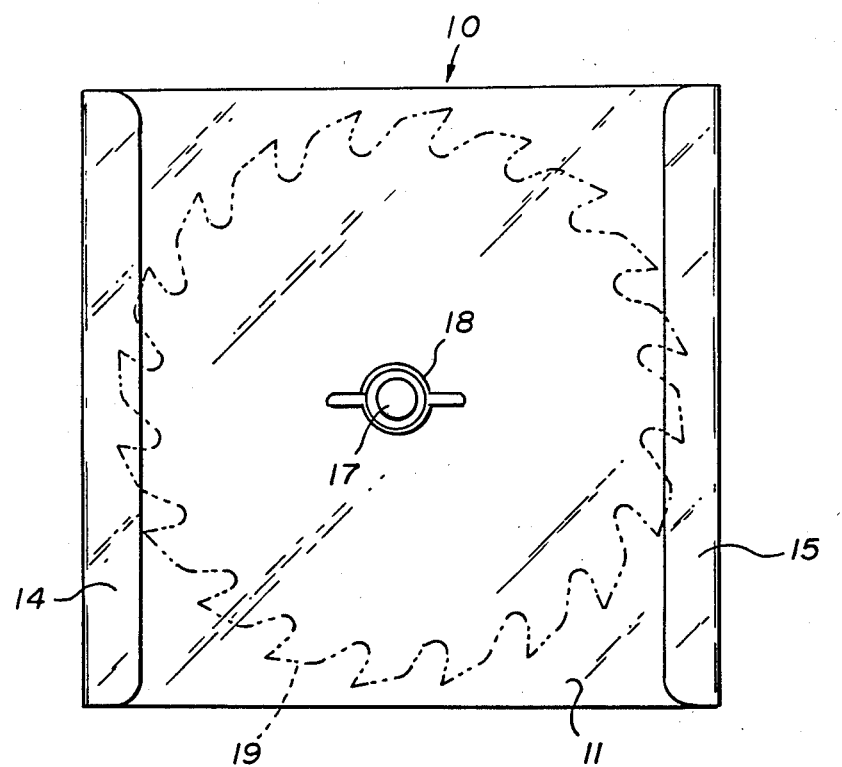
FIG. 3 is a top view of the structure shown in FIG. 2.

Referring to FIG. 1, a protective housing 10 according to the invention formed as an integral structure is shown, comprising a face plate 11 having lateral flanges formed at two opposite edges 12 and 13, substantially perpendicular to the face plate with both lateral flanges oriented in the same direction. At the outer edges of the lateral flanges 12 and 13 are foot flanges 14 and 15, oriented substantially perpendicular to the lateral flanges 12 and 13 and directed toward each other. The foot flanges 14 and 15 serve to protect the saw blade edges and also to engage a supporting surface upon which the housing is placed.

An aperture 16 is provided centrally in the face plate 11 for receiving a bolt 17, preferably a carriage bolt. A nut 18, preferably a wing nut, is provided to enage the threads of the bolt 17.

Referring to FIG. 2, a protective housing 10 is shown in which a plurality of circular saw blades 19 have been placed in the housing 10 and affixed therein. The process of mounting the circular saw blades 19 in the housing 10 is carried out by first removing the bolt 17 from the aperture 16. The saw blades 19 are then inserted into the housing 19 with their central apertures superposed over the aperture 16 of the face plate 11. The bolt is inserted through the aperture 16 and through the apertures of the saw blades 19. The nut 18 is then engaged on the end of the bolt and turned until it becomes positioned tightly against the saw blades, thereby securing them in the housing.

Referring to FIG. 3, a top view of the invention is shown, having a plurality of blades 19 secured within the housing 10, and showing how the foot flanges 14 and 15 overlap the edges of the blades and protect them from contact with a person or the environment.

It is preferred that the bolt 17 be a carriage bolt, and that the aperture 16 have a rectangular and preferably a square shape so that when the nut 18 is turned over the bolt 17 to tighten against the saw blades 19, the bolt does not rotate. It is also preferred that the nut 18 be a wing nut so the nut may be tightened by hand without the need for a wrench.

The protective housing of the present invention may be made of any of a variety of materials and by any of a number of processes. The housing may be formed of a single sheet of plastic material with the flanges bent by the application of heat. The housing may also be formed of a sheet of metal such as steel or aluminum, with the flanges being bent by conventional forming processes. Alternatively, the housing may be formed of either plastic material or metal by extrusion into long stock of the desired cross-section, and individual housings cut therefrom to the desired length. Among the plastic materials which may be used to form the present housing are polymethylmethacrylate, polystyrene, Lexan, polyvinyl chloride, polycarbonate, polyurethane, and many other related materials. The housing may also be made of sheet metal such as steel or aluminum. The housing may also be made of glass.

The protective housing of the present invention has many advantages over prior art structures. It is easily manufactured from commercially available materials, and using simple conventional equipment and processes. Both the material and processing are very inexpensive, and the housing may be manufactured at low cost. It provides excellent protection for the saw blades mounted therein. It also protects the workman from injury and the environment from damage during transportation of the blades. The structure of the housing is very strong and can withstand a good deal of bumping and dropping without damage.

Although the invention has been described in connection with specific embodiments thereof, it is evident that many alternatives, modifications, and variations will be apparent to those skilled in the art in the light of the foregoing description and drawing. Accordingly, it is intended to embrace all such alternatives, modifications and variations within the spirit and scope of the invention as defined by the appended claims.

Invention is claimed as follows:

1. A protective housing for storing and transporting circular saw blades, comprising an integral structure having a face plate having two opposte edges and a centrally located aperture, a lateral flange at each of said two opposite edges of said face plate and oriented substantially perpendicular to said face plate, a pair of foot flanges one extending from the edge of each of said lateral flanges, a bolt adapted to extend through the aperture of said face plate, and a nut adapted to engage the threaded end of said bolt, whereby a plurality of circular saw blades may be placed in said protective housing, said bolt extended through the aperture of said face plate and the apertures of said saw blades, and said nut engaged with the threads of said bolt and tightened down against said saw blades.

2. A protective housing according to claim 1, wherein said foot flanges are directed toward each other.

3. A protective housing according to claim 1, wherein said bolt is a carriage bolt and the aperture of said face plate is rectangular and adapted to engage the rectangular lug of said carriage bolt and prevent it from rotating when said nut is being tightened.

4. A protective device according to claim 1, wherein said nut is a wing nut.

5. A protective device according to claim 1, formed of a plastic sheet which is heated to form said flanges.

6. A protective housing according to claim 1, formed of a plastic sheet extruded to form an elongated housing stock, and subsequently cut to the proper length.

7. A protective housing according to claim 1, formed of sheet metal bent to provide said lateral flanges and said foot flanges.

8. A protective housing according to claim 1, formed of extruded metal providing an elongated housing stock, and cutting the stock to the proper length.

* * * * *